(No Model.)
E. M. SAMSEL.
DEHORNING IMPLEMENT.
No. 474,696. Patented May 10, 1892.
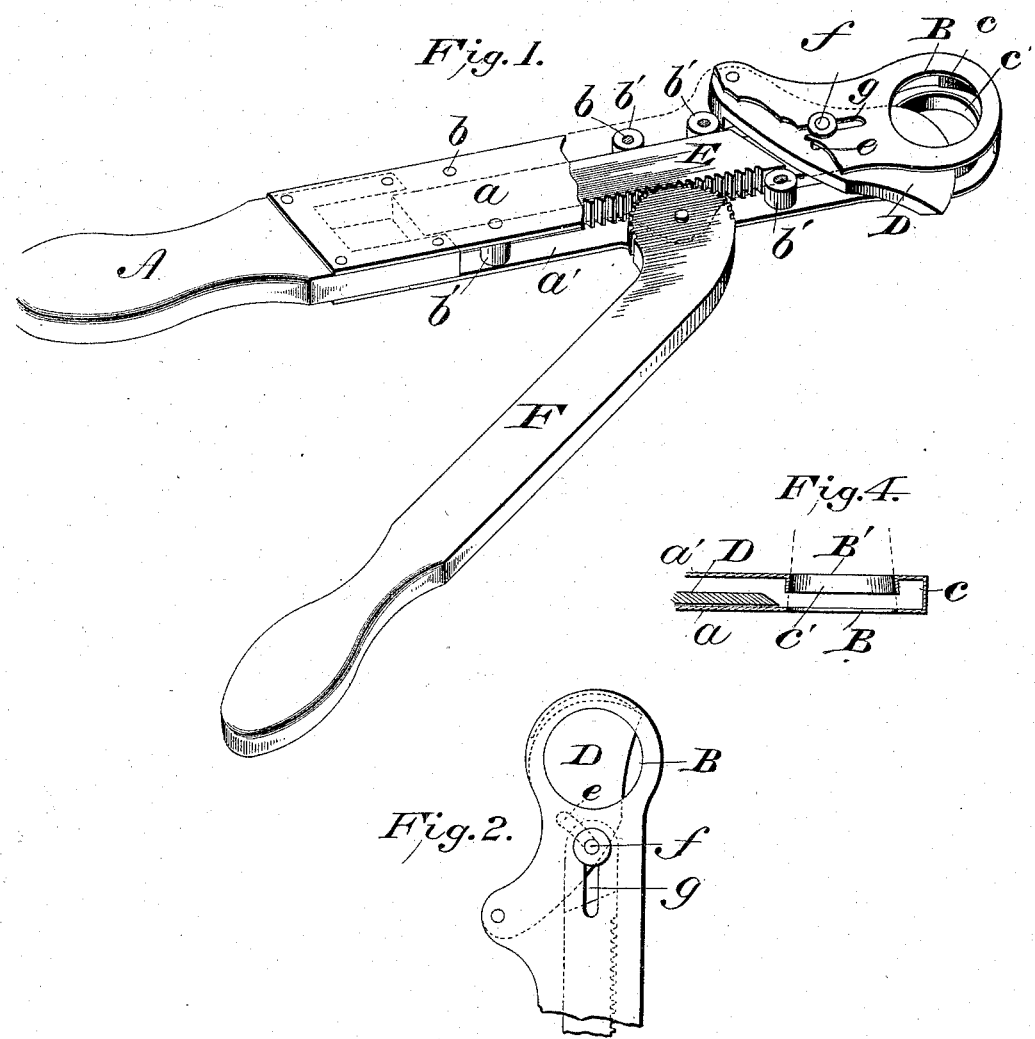
Witnesses
L. S. Elliott.
C. W. Johnson.
Elwood M. Samsel
Inventor
by [signature]
Attorney

UNITED STATES PATENT OFFICE.

ELWOOD MORSE SAMSEL, OF MARCELINE, MISSOURI.

DEHORNING IMPLEMENT.

SPECIFICATION forming part of Letters Patent No. 474,696, dated May 10, 1892.

Application filed February 25, 1892. Serial No. 422,802. (No model.)

*To all whom it may concern:*

Be it known that I, ELWOOD MORSE SAMSEL, a citizen of the United States of America, residing at Marceline, in the county of Linn and State of Missouri, have invented certain new and useful Improvements in Implements for Dehorning Cattle; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
This invention relates to improvements in implements for dehorning cattle.

The object of the invention is to provide an implement having an aperture through which the horn is passed and a pivoted blade operated by a handle so as to give the same a shearing cut, said blade being connected to a reciprocating rack-bar which is operated by a handle, as will be hereinafter fully set forth, and particularly pointed out in the claims.
In the accompanying drawings, forming part of this specification, Figure 1 is a perspective view partly broken away. Fig. 2 is a plan view of one end of the implement. Fig. 3 is a perspective view of the cutting-blade detached, and Fig. 4 is a detail sectional view.

A designates one of the handles, to which are rigidly secured plates $a$ and $a'$, these plates being attached at one end to the handle and held apart at suitable intervals by pins or rivets $b$, upon which are mounted anti-friction rollers $b'$. The upper plate $a$ has near its end opposite the handle a circular aperture B, and at the end is a segmental strip $c$, which secures the ends of the plates $a$ and $a'$ to each other. The plate $a'$ is apertured at B' to register with the aperture B in the plate $a$, the latter aperture being a little larger, while the aperture B' has an inwardly-projecting flange $c'$, which extends sufficiently inward to allow the blade D to play snugly between the edges of the same and the plate $a$. The apertures B and B' are made of different diameters so that when the implement is placed on the horn of an animal it will fit snugly upon the same and correspond with the taper thereof, and when the horn is severed by the blade the rim or flange $c'$ will retain the same upon the implement, this flange also serving to keep the cutting-edge against the under side of the plate $a$ to insure a smooth cut. By retaining the severed portion of the horn within the implement the operator will readily know when the cut has been completed. The blade D has one flat face, while the curved or cutting edge of the opposite face is beveled, as shown. The end of the blade through which the pivot-pin passes has an offset $d$. This blade has near its central portion a segmental aperture or slot $e$, through which passes a pin, said pin being rigidly attached to the rack-bar E, which has a reduced end to receive the cutting-blade. This pin $f$, which is carried by the rack-bar, plays in slots $g$ in the plates $a$ and $a'$. The opposite edges of the rack-bar abut against anti-friction rollers, said rollers being so disposed between the plates as to be out of contact with the teeth of the rack-bar, and said rack-bar is reciprocated by manipulating the lever F, which is pivoted between the plates and has a toothed portion for engagement with the rack-bar. It will be noted that by this construction when the lever F is operated the rack-bar will be reciprocated and, being connected to the blade, will move the same upon its pivot, so as to sever the object placed or held in the path of said blade.

I am aware that prior to my invention implements for dehorning cattle have been made in which a rack-bar having a blade formed integral therewith was reciprocated between apertured blades by a lever; and I do not claim such construction as my invention; but

What I claim as new, and desire to secure by Letters Patent, is—

1. In a dehorning implement, the combination of a handle having apertured plates B and B', said apertures being of different diameters, the apertured plates B', having an inwardly-projecting flange $c'$, and a knife or blade adapted to be moved across said apertures, substantially as shown, and for the purpose set forth.

2. In an implement for dehorning cattle, the combination of a handle having parallel plates secured thereto and held apart by pins or rivets having friction-rollers mounted thereon, a rack-bar adapted to engage with said friction-rollers, the end of said rack-bar engaging with the pivoted blade pivoted between said plates, and a lever having a toothed end for reciprocating said rack-bar, substantially as shown, and for the purpose set forth.

3. In an implement for dehorning cattle, the combination of the plates $a$ and $a'$, secured to a handle and to each other, said plates having apertures B and B', and a knife or blade pivoted between the plates and provided with means for connecting the same with a rack-bar, said rack-bar being engaged by a pivoted lever having a toothed portion, substantially as shown, and for the purpose set forth.

4. In a device for dehorning cattle, the combination of the parallel plates rigidly attached at one end to the handle of said plates, having at the end opposite the handle apertures B and B' of different diameters, the aperture B' having a projecting flange or rim, a blade having a flat portion and a beveled cutting-edge, a projection $d$ being formed adjacent to the pivot on the side of the blade having the beveled edge, and a reciprocating rack-bar operated by a lever pivoted between the plates $a$ and $a'$, the end of said rack-bar being reduced in thickness and provided with a pin which plays in a segmental slot formed in the blade, substantially as shown, and for the purpose set forth.

In testimony whereof I affix my signature in presence of two witnesses.

ELWOOD MORSE SAMSEL.

Witnesses:
 H. A. DINSMORE,
 AARON ROOTS.